(12) United States Patent
Jijina et al.

(10) Patent No.: US 7,395,045 B2
(45) Date of Patent: Jul. 1, 2008

(54) METHOD AND SYSTEM FOR CALL ROUTING FOR 911 NETWORK CONNECTIVITY

(75) Inventors: Jasmin Jijina, West Bloomfield, MI (US); William E. Italia, Howell, MI (US); William E. Mazzara, Jr., Drayton Plains, MI (US); Bruce A. Groskreutz, Grand Blanc, MI (US)

(73) Assignee: General Motors Corporation, Detroit, MI (US)

( * ) Notice: Subject to any disclaimer, the term of this patent is extended or adjusted under 35 U.S.C. 154(b) by 1147 days.

(21) Appl. No.: 10/305,380

(22) Filed: Nov. 26, 2002

(65) Prior Publication Data

US 2004/0203569 A1    Oct. 14, 2004

(51) Int. Cl.
*H04M 11/04* (2006.01)
(52) U.S. Cl. .................... 455/404.1; 455/404.2
(58) Field of Classification Search ........... 455/404.1, 455/404.2, 445, 456.1, 457
See application file for complete search history.

(56) References Cited

U.S. PATENT DOCUMENTS

| | | | |
|---|---|---|---|
| 5,761,278 A | 6/1998 | Pickett et al. | 379/90.01 |
| 5,799,061 A | 8/1998 | Melcher et al. | 379/45 |
| 6,256,489 B1 * | 7/2001 | Lichter et al. | 455/404.2 |
| 6,819,929 B2 * | 11/2004 | Antonucci et al. | 455/445 |

OTHER PUBLICATIONS

"Location Based Telematics Emergency Call Solution with Native 9-1-1 Delivery", author: Patty McCalmont, Jun. 26, 2002.

"Routing based on position" for North American GSM and some other things, author: Jeffrey Rhodes, TeleCommunication Systems, Jul. 9, 2002.

* cited by examiner

*Primary Examiner*—Matthew Anderson
*Assistant Examiner*—Eugene Yun

(57) ABSTRACT

A method for call routing for emergency network connectivity, comprising A method for call routing for emergency network connectivity, comprising: utilizing a public communications network, establishing a trigger connection from a service management system to a mobile switching center serving a mobile unit; and using the trigger connection, triggering an emergency 911 connection from the mobile switching center to a public safety answering point serving the mobile unit based upon a unit position data of the mobile unit.

5 Claims, 4 Drawing Sheets

500

METHOD AND SYSTEM FOR CALL ROUTING FOR 911 NETWORK CONNECTIVITY

FIELD OF THE INVENTION

This invention relates to a method and system for routing wireless 911 calls on a network.

BACKGROUND OF THE INVENTION 911 services are rapidly expanding in scope to include wireless units. Wireless units include conventional portable analog and digital phones and those installed as embedded components of telematics systems in vehicles.

In an example telematics service system, an operating service management subsystem acts as an intermediary or gateway into 911 services. If the occupants of a vehicle equipped with a telematics unit place an emergency call to a service management subsystem, an agent at the service management subsystem extracts vehicle position data and establishes contact with the vehicle occupants. The agent locates a PSAP (Public Safety Answering Point) within proximity of the telematics unit, then contacts the PSAP via an administrative line. Administrative lines are voice only physical telephone lines that do not have 911-priority status. The agent at the service management subsystem converses with an operator at the PSAP and conveys the location and description of the vehicle that placed the emergency call. The agent at the service management subsystem facilitates a connection between the vehicle and the PSAP, then disengages from the call.

Wire-line 911 functionality is being extended to incorporate wireless communications devices. These new functional extensions include a Public Safety Answering Point/Computer Aided Dispatch system that acts as a local 911 response entity, and an Automatic Location Identification database that provides the location of the mobile unit, or wireless telephone, at the time an emergency call is placed. Other extensions include a Positioning Determination Entity that uses one of several position determination technologies to derive the location of a mobile unit, and a Coordinate Routing Database that translates mobile unit latitude and longitude into a key relating to the Emergency Services Zone where a vehicle is located.

Telematics service providers are faced with a set of new issues when migrating to wireless 911 functionality. Telematics service providers have access to the location of the mobile unit placing the emergency call, obviating or reducing the need for accessing the Positioning Determination Entity. Other issues for a telematics service provider are the lack national 911 trunk connectivity, lack of standardized message routing formats and protocols, and the lack of standardized formats and protocols for populating local Automatic Location Identifier databases. Connectivity to these components may be prevented, interrupted or disconnected due to faults within the public network, such as mismatched routing and ALI protocols.

SUMMARY OF THE INVENTION

Advantageously, this invention provides a method for 911 network call routing.

Advantageously, this invention provides a method and system for remotely initiating and signaling an emergency call to provide enhanced functionality over a 911 network. These advantages are achieved by implementing new functions into the 911 network that remotely initiate and signal an emergency call, and route the data from the telematics provider into the 911 network.

Advantageously then, according to a preferred example, this invention provides a method for call routing for emergency network connectivity, comprising placing a call from a mobile unit to a service management system, transferring unit position data representing a position of the mobile unit to the service management system, utilizing a public communications network, establishing a connection from the service management system to a mobile switching center serving the mobile unit, establishing an emergency connection from the mobile switching center to the public safety answering point serving the vehicle based upon the unit position data, transferring the unit position data to the public safety answering point; and enabling voice communications from the mobile unit to the public safety answering point through the call.

DETAILED DESCRIPTION OF A PREFERRED EMBODIMENT

Figure 1:
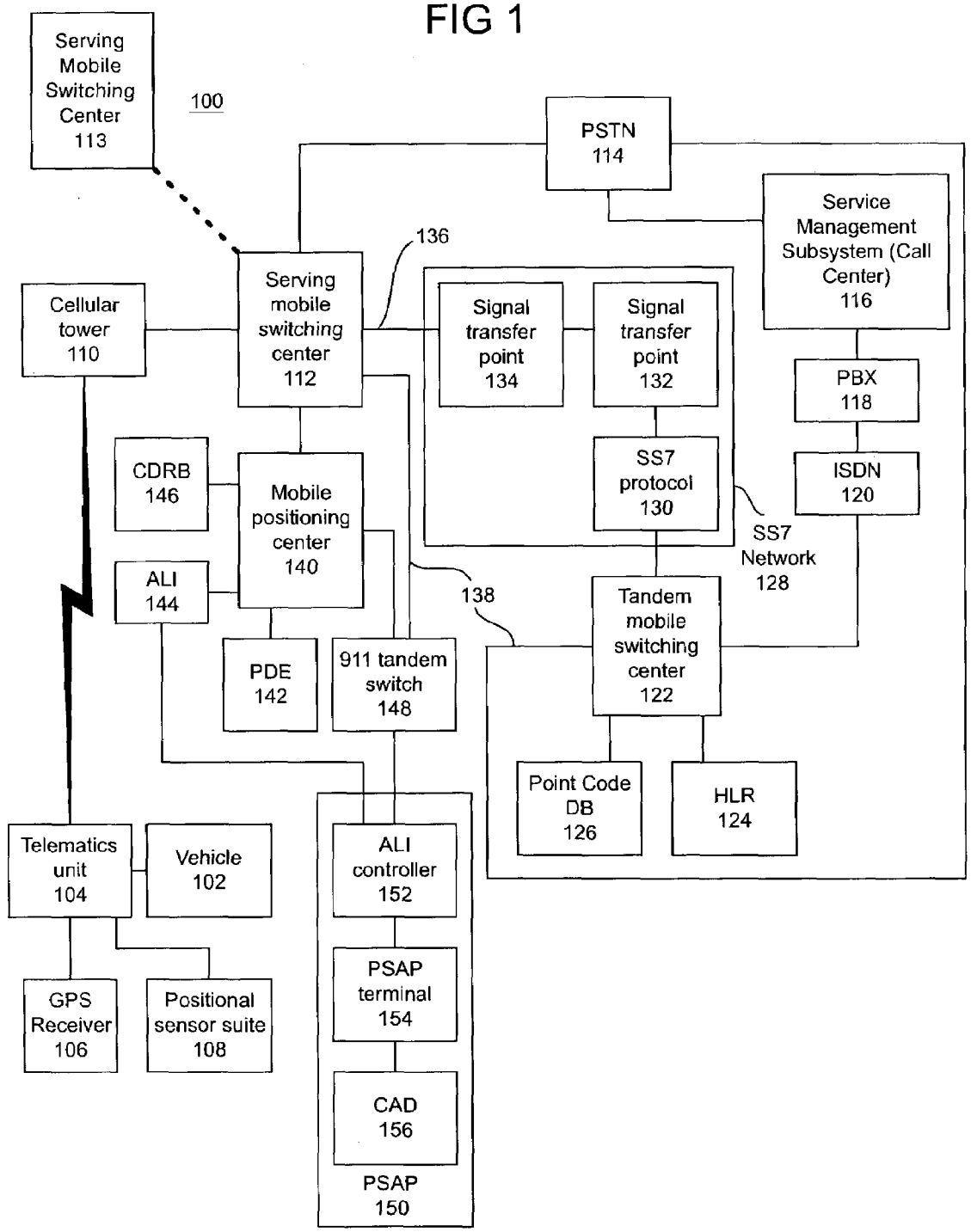
FIG. 1 is a schematic diagram of a system for call routing for 911 network connectivity in accordance with an example of the present invention.

FIG. 1 illustrates an example system according to the present invention at 100 including a vehicle 102 that contains a telematics unit 104, a GPS (Global Positioning System) receiver 106, and a positional sensor suite 108. The positional sensor suite 108 may contain positional sensors and transducers of any type known to those skilled in the art suitable for obtaining or supplementing vehicle position. When the vehicle 102 or its occupants place an emergency call, the telematics unit 104 in the vehicle 102 retrieves the vehicle position from the GPS receiver 106 connected to the telematics unit 104. Vehicle position may alternatively be retrieved from a positional sensor suite 108 connected to the telematics unit 104.

The emergency call is connected in data mode to a service management subsystem 116 via a cellular tower 110, a serving MSC (Mobile Switching Center) 112, and the PSTN (Public Safety Telephone Network) 114, ultimately connecting to the service management subsystem 116. The service management subsystem 116, operated by a telematics service provider, is also referred to as a call center.

A plurality of vehicle 102 specific data, such as the current position of the vehicle 102, vehicle identification number, the network SID (System Identifier), and ESN Electronic Serial Number)/MIN (Mobile Information Number) pair of the telematics unit 104 are delivered to the service management subsystem 116 in data mode. The network SID associates a set of serving MSCs 112, tandem MSCs (Mobile Switching Centers) 122, or both with a particular geographic region.

Serving MSCs and tandem MSCs are telephony switches well known to skilled practitioners in the art.

After the vehicle 102 specific data is delivered, the call is switched from data mode to voice mode. An agent at the service management subsystem 116 attempts to establish voice contact with the vehicle 102 occupants. The agent at the service management subsystem also initiates an outbound call via the service management subsystem 116 dedicated PBX (Private Branch Exchange) 118 over a dedicated ISDN (Integrated Services Digital Network) 120 line or other dedicated channel, such as a T1 line, connecting with a tandem MSC 122. The data content of the call contains a plurality of data parameters, including the positional data of the telematics unit 104, the VID (vehicle identification number), the network SID (System Identifier), the MIN (Mobile Information Number), MDN (Mobile Dialing Number), and ESN (Electronic Serial Number) of the telematics unit 104. The positional data received from the telematics unit 104 is typically the latitude and longitude of the telematics unit 104 at the time when the emergency call was placed.

The tandem MSC 122 queries one of two entities containing an HLR (Home Location Register) 124 or a point code database 126. Both the HLR 124 and the point code database 126 return to the tandem MSC 122 the point code of the serving MSC 112—the serving MSC 112 being the mobile switching center serving the cell tower 110 in contact with the vehicle 102 telematics unit 104 during the emergency call. The HLR 124 is queried with the ESN of the telematics unit 104, and the point code database 126 is queried with the SID and latitude and longitude of the telematics unit 104.

The tandem MSC 122, which now contains the point code of the serving MSC 112, signals the serving MSC 112 via an SS7 (Signaling System 7) network 128. Utilizing the SS7 protocol 130, a signal transfer point 132 associated with the tandem MSC 122 communicates with a signal transfer point 134 associated with the serving MSC 112. This signaling 136 establishes a path for a voice circuit 138 over a wireless, wireline, and 911 network.

If the tandem MSC 122 is unable to connect with the serving MSC 112, the tandem MSC 122 may query the HRL 124 or the point code database 126 for additional point codes identifying another serving MSC 113 within proximity of the serving MSC 112 that failed to connect. This defines a one to one signaling relationship between a tandem MSC 122 and a serving MSC 112, 113.

In an alternative example, multiple SIDs may be used to query point code database 126 to retrieve a plurality of point codes. Signals are issued between the tandem MSC 122 and multiple serving MSCs, as determined by the point codes retrieved from the point code database 126. This defines a one to many signaling relationship between a tandem MSC 122 and a plurality of serving MSCs 112, 113. Additionally, an alert may be issued for a specific geographic area where a plurality of tandem MSCs 122 and serving MSCs 112, 113 may be identified by a plurality of SIDs retrieved from the point code database 126, resulting in communication with a plurality of PSAPs 150. This defines a many to many relationship between tandem MSCs 122 and serving MSCs 112. In certain contexts, the established communication may be data only.

Signal transfer point 132 and signal transfer point 134 signal each other for transfer of data and emergency call initiation at the serving MSC 112. The emergency call initiation is termed an ESC (Emergency Services Call) trigger. The signaling and ESC trigger prompt the serving MSC to initiate a normal 911 call. Contained within the ESC trigger are all of the relevant telematics unit 104 data associated with the emergency call. This data is comprised of the position of the telematics unit 104, the VID (vehicle identification number), the network SID (System Identifier), the MIN (Mobile Information Number), MDN (Mobile Dialing Number), and ESN (Electronic Serial Number) of the telematics unit 104. The ESC trigger mimics an incoming emergency call at the serving MSC 112 and is pivotal in establishing the three-way connection to the PSAP (Public Safety Answering Point) 150, encompassing the service management subsystem 116 and the telematics unit 104.

The presence of the ESC trigger causes the serving MSC 112 to query the mobile positioning center 140 in order to retrieve an ESRK (Emergency Services Routing Key). The ESRK identifies an appropriate PSAP (Public Safety Answering Point) 150 associated with the serving MSC 112. The ESRK is embodied in a digit string that uniquely identifies an ongoing emergency services call and is used to correlate the call with associated data messages. The ESRK is also used to query the ALI data base. It may also identify an Emergency Service Zone (ESZ) and may be used to route the emergency call through a telephone network. An ESZ contains a combination of emergency services agencies, such as law enforcement, fire, and emergency medical services, designated to service a specific range of addresses within a particular geographic area.

The latitude and longitude data identifying the location of the telematics unit 104 is used as input to query the mobile positioning center 140 associated with the serving MSC 112. The latitude and longitude values are transferred from the mobile positioning center 140 to the CRDB (Coordinate Routing Database) 146. The CRDB 146 looks up the corresponding ESRK using the received latitude and longitude values and returns the ESRK to the mobile positioning center 140. The ESRK is returned to the serving MSC 112 and is used to select a 911 trunk line connected to an appropriate 911 tandem switch 148.

According to known standards, when the position of a mobile unit is unknown, which is the case with many wireless units during an emergency call, the mobile position center 140 issues a request to the PDE (Position Determination Entity) 142 to select a method to determine the position of the wireless unit. But in the example where the vehicle has a telematics unit 104 and the call center 116 can, according to this invention, send the position of vehicle 102 through the serving MSC 112, the need for mobile position center 140 to request position from the PDE 142 is obviated. The position request from the mobile positioning center 140 to the PDE 142 may still occur with the return values ignored by the system.

The ESRK, received from CRDB 148, and latitude and longitude, received from the telematics unit 104, are stored in an ALI (Automatic Location Identification) 326 database, where they remain available for retrieval. The 911 tandem switch 148 selects a 911 trunk line by referencing the ESRK in order to establish a connection to the appropriate local PSAP (Public Safety Answering Point) 150. The ESRK is delivered to the PSAP 150 once the connection is established. Upon the delivery of the ESRK to the PSAP 150, a circuit is now identified between the PSAP 150 and the service management subsystem 116. A signal is issued to the service management subsystem 116 PBX 118 establishing a circuit between the service management system 116 and the PSAP 150. A voice connection 138 is established as a consequence of this signaling and circuit.

Within the PSAP 150 an ALI (Automatic Location Identifier) controller 152 queries the ALI database 144 using the ESRK to retrieve the previously deposited data for the telematics unit 104 originating the emergency call. The ALI database 144 returns the data to the PSAP 150, where the data is displayed at the PSAP 150 CAD (Computer Aided Dispatch) 156. Simultaneously, voice communications are established with the PSAP 150 PSAP terminal 154 and the agent at the service management subsystem 116. The agent at the service management subsystem, currently in communication with the vehicle 102 occupants containing the telematics unit 104, conferences in all parties, facilitating communications between the vehicle 104 and occupants, the service management subsystem 116, and the PSAP 150. The agent at the service management subsystem may choose to stay on the call, or disconnect from the call, all without disturbing the connection between the vehicle 120 occupants and the PSAP 150.

Figure 2:
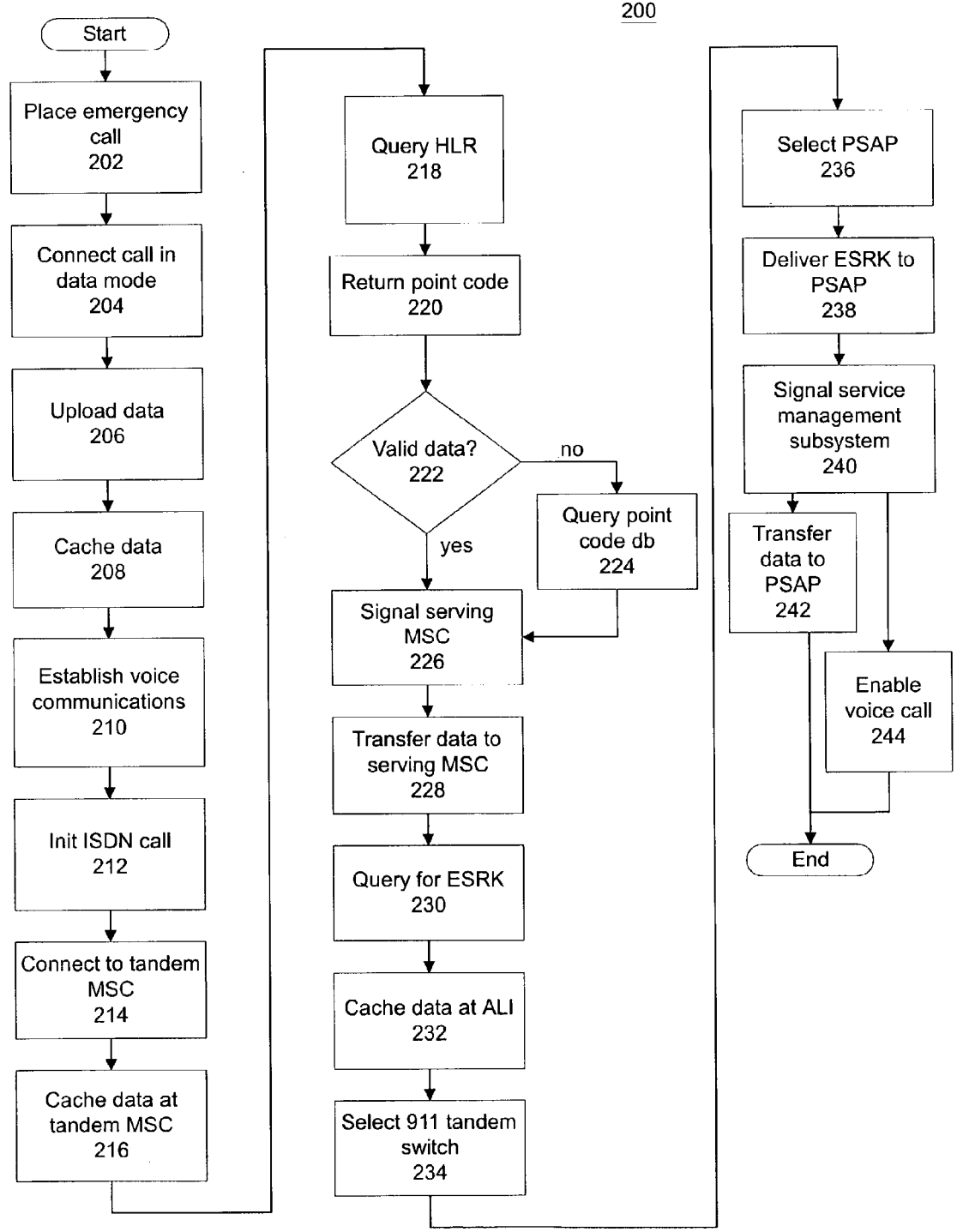
FIG. 2 is a flow chart for determining the source of an emergency call within a 911 network in accordance with an example of the present invention.

Referring now also to FIG. 2, there is provided a flow chart for telematics service provider call routing for 911 network connectivity in accordance with an example of the present invention at 200. An emergency call 202 may be placed from a telematics unit (104, FIG. 1) located within a vehicle (102, FIG. 1) communicating with a GPS receiver (106, FIG. 1) and a positional sensor suite (108, FIG. 1). The emergency call 202 is connected in data mode 204 to a service management subsystem (116, FIG. 1).

Information relevant to the vehicle and telematics unit is uploaded 206 to the service management subsystem (116, FIG. 1), is cached 208, and is made available to an agent at the service management subsystem (116, FIG. 1). The data relevant to the vehicle may consist of a VID (vehicle identification number), a network SID (System Identifier), a MIN (Mobile Information Number)/MDN (Mobile Dialing Number), and ESN (Electronic Serial Number) of the telematics unit 104, along with location, telemetry, ACN and diagnostic data to the extent provided by the telematics unit 104. Voice communication is established 210 with the vehicle occupants, if possible. The agent at the service management subsystem (116, FIG. 1) establishes a connection via an ISDN or other dedicated line, such as a T1 line, to a tandem MSC (Mobile Switching Station) 214. When this connection is established, the call center 116 transmits the vehicle data to the tandem MSC 122, where the data is cached 216.

The tandem MSC 122 utilizes the ESN to query 218 an HLR (Home Location Register) 124 associated for a point code identifying the location of the serving MSC (Mobile Switching Center) (112, FIG. 1) that was used in the initiation of the emergency call. The point code is returned to the tandem MSC 220. If the data returned from the HLR is incomplete, unavailable, or invalid 222, the tandem MSC queries 224 a point code database 126 for the point code data. In one example, the point code data includes signaling points identified by a 24-bit binary code termed a signaling point code or point code. A point code consists of three fields; a network identification field, a network cluster field, and a cluster member field, and is well understood by skilled practitioners in the art.

Once the serving MSC 112 is signaled at block 226, the vehicle data cached at the tandem MSC is transferred (block 228) to the serving MSC 112. The signaling and vehicle data transfer 228 constitute an ESC (Emergency Services Call) trigger. The ESC trigger stimulates the serving MSC 112 to initiate a 911 call. The serving MSC 112 queries (block 230) the mobile positioning center 140 for an ESRK (Emergency Services Routing Key). The ESRK identifies an appropriate PSAP (Public Safety Answering Point) (150, FIG. 1) associated with the serving MSC (112, FIG. 1). The ESRK is returned as a result of the query, and the vehicle data is cached (block 232) at the ALI (Automatic Location Identifier) database 144 associated with the serving MSC 112, and the mobile positioning center 140.

A 911 tandem switch 148 is selected 234 based on the ESRK, and an appropriate PSAP 150 is selected 236. The ESRK is delivered (block 238) to the PSAP 150, which signals (block 240) the service management subsystem 116. This signaling establishes a circuit between the PSAP 150 and the service management subsystem 116. The PSAP 150, using the ESRK, retrieves (block 242) the vehicle data cached at the ALI 144.

Simultaneously, a voice connection is established 244 between the service management subsystem 116 and the PSAP 150.

Figure 3:
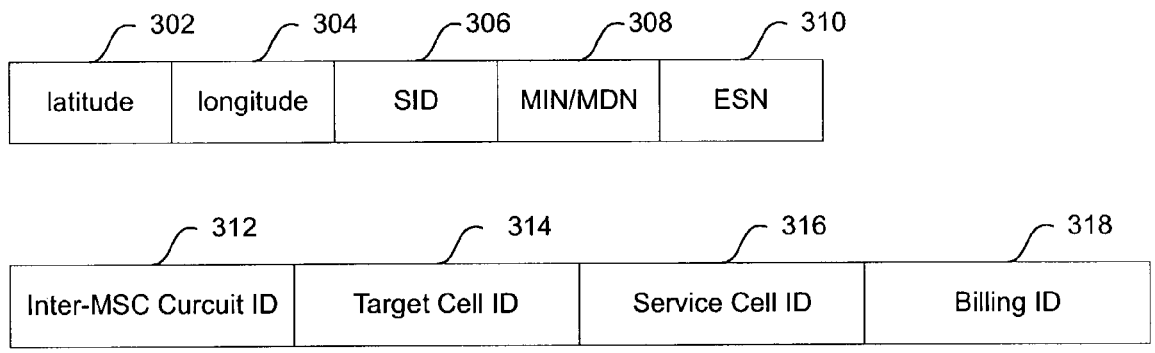
FIG. 3 is a schematic diagram of a message used for routing location and identification information into the existing 911 system.

Referring now also to FIG. 3, there is provided a schematic diagram of an ESC (Emergency Services Call) trigger information packet enabling call routing for 911 network connectivity in accordance with the present invention at 300. When the signal transfer point of the tandem MSC 122 signals the signal transfer point 134 of the serving MSC 112, an SS7 (System Number 7) message assigned the name TSP_Emergency_Message is issued. Associated with this message is a plurality of parameters.

The first two parameters are the latitude 302 and longitude 304 of the telematics unit (104, FIG. 1) originating the emergency call. The third parameter is the SID (System Identifier) 306 that associates a set of MSCs (112, 113, 122, with a particular geographic region. The fourth parameter is the MIN (Mobile Information Number)/MDN (Mobile Dialing Number) 308 of the telematics unit 104 originating the emergency call. The MIN is the telephone number assigned to the telematics unit, and the MDN is a relative telephone number assigned to the telematics unit. The fifth parameter is the ESN (Electronic Serial Number) 310 identifying the telematics unit. These first five parameters are uploaded from the telematics unit (104 FIG. 1) to the service management subsystem (116, FIG. 1) when the emergency call is placed.

The sixth parameter is the Inter-MSC (Mobile Switching Center) Circuit ID 312, which identifies the circuit between a tandem MSC (122, FIG. 1) and a serving MSC (112, FIG. 1). The Inter-MSC Circuit ID 312 may identify several intermediate MSCs the signal may travel through. The seventh parameter is a Target Cell ID 314 identifying the serving MSC 112 sought, and the eighth parameter is the Service Cell ID 316 identifying the tandem MSC (122, FIG. 1) that is the source of the TSP_Emergency_Message. The ninth parameter is the Billing ID, which is used to identify the serving MSC (112, FIG. 1).

Figure 4:
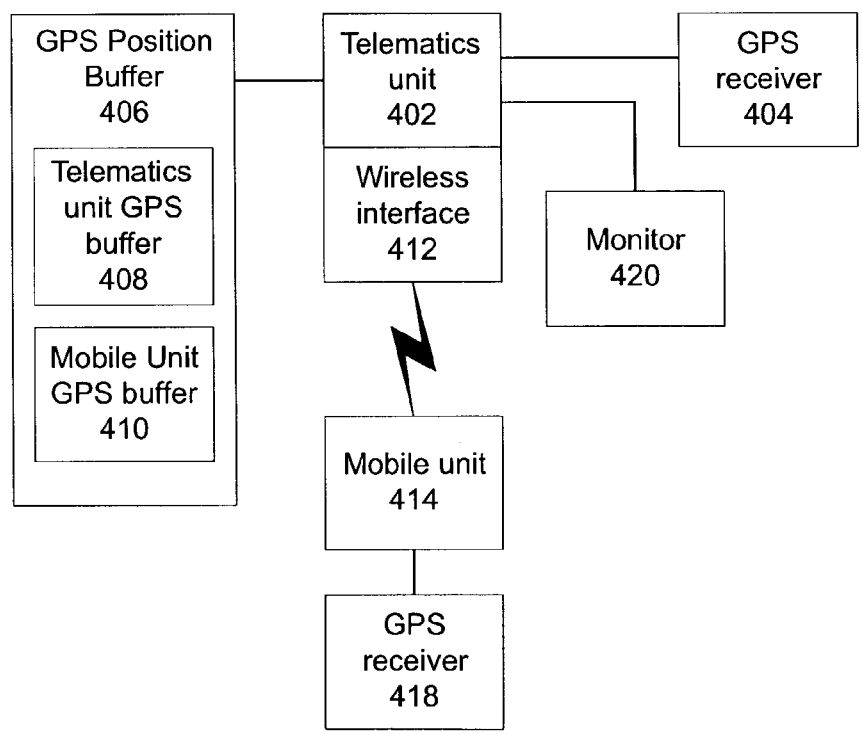
FIG. 4 is a schematic diagram for selecting the preferred source of positional data in accordance with the present invention.

FIG. 4 is a schematic diagram of an example system for selecting the preferred source of positional data from a telematics unit in accordance with the present invention at 400. With the advent of short range wireless networks, such as Bluetooth and 802.11, cellular phones, PDAs (Personal Data Assistants), or embedded mobile units may communicate with a telematics unit 414 equipped with a wireless network interface 412. Many mobile units 414 are equipped with a GPS receiver 418 that provides the current position and GPS quality parameters associated with the current position of the mobile unit 414. The quality parameters may consist of the number of satellites in view, dilution of precision, or any other GPS quality parameters that are well known to skilled practitioners in the art. The position and quality data provided by the GPS receiver 418 associated with the mobile unit 414 may be transmitted to the telematics unit 402 via the wireless interface 412.

The telematics unit 402 is equipped with a GPS receiver 404 that provides the current position and GPS quality parameters of the telematics unit 402. The telematics unit 402 may contain a memory area deemed a GPS position buffer 406 that contains partitioned memory designated as a telematics unit GPS buffer 408 and a mobile unit GPS buffer 410. Positional and GPS quality data received from the GPS receiver 418 associated with the mobile unit 414 is stored in the mobile unit GPS buffer 410. The positional and GPS quality data received from the GPS receiver 404 associated with the telematics unit 402 is stored in the telematics unit GPS buffer 408.

A monitor 420 associated with the telematics unit 404 compares the GPS position and quality data from the telematics unit GPS buffer 408 and the mobile unit GPS buffer 410 and selects the position with the highest quality parameters. The highest quality positional data selected is transmitted to the service management subsytem (116, FIG. 1).

Figure 5:
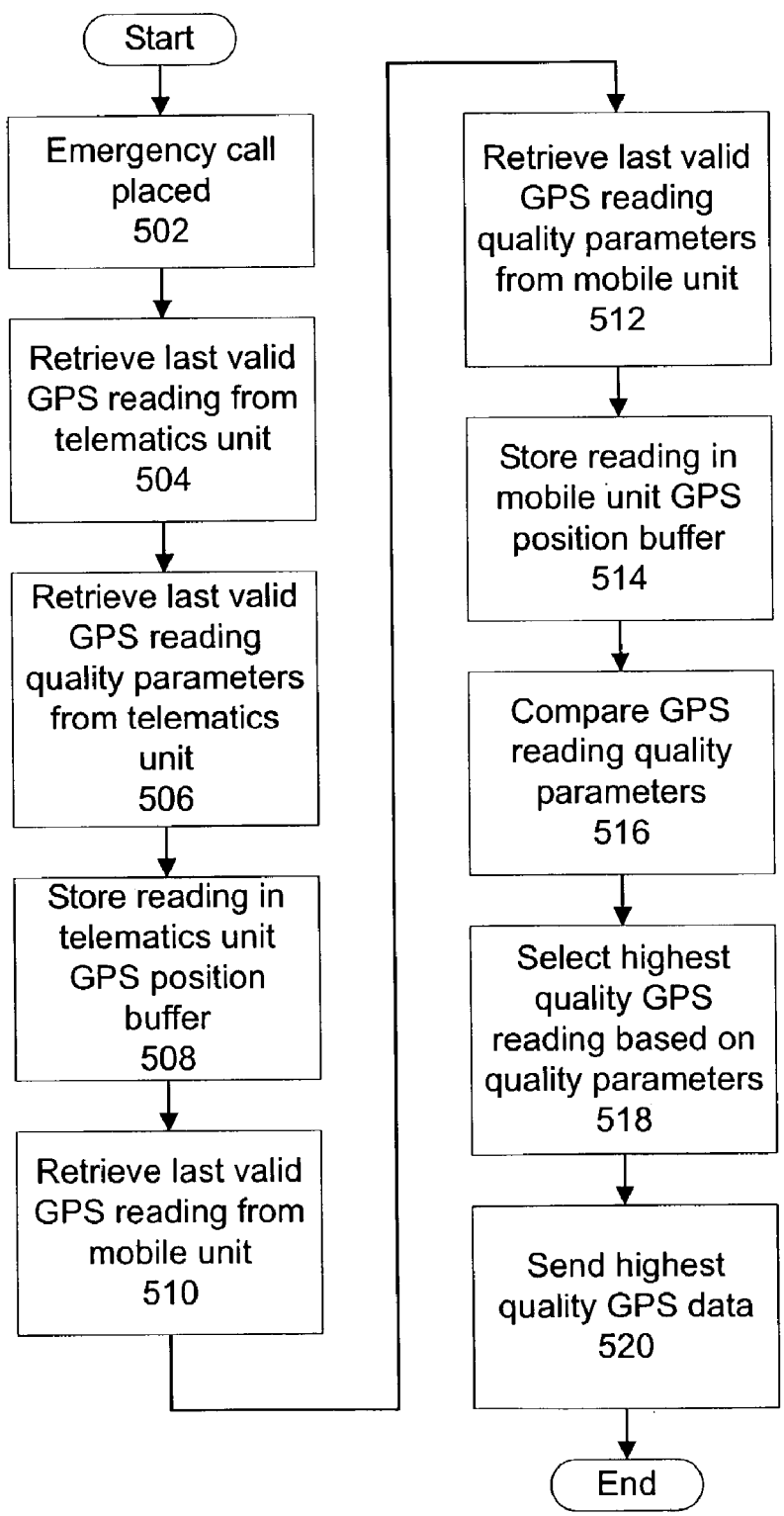
FIG. 5 is a flow chart for selecting the preferred source of positional data in accordance with the present invention.

FIG. 5 is a flow chart of a system for selecting the preferred source of positional data from a telematics unit in accordance with an example of the present invention at 500. An emergency call is placed 503 from either a telematics unit (402, FIG. 4) or a mobile unit (414, FIG. 4). The last valid GPS reading is retrieved 504 from the telematics unit 402. The quality parameters associated with the last valid GPS reading from the telematics unit 402 are retrieved 506. The last valid GPS reading and the associated quality parameters are stored 508 in a telematics unit GPS buffer 408.

The last valid GPS reading is retrieved 510 from the mobile unit 414. The quality parameters associated with the last valid GPS reading from the mobile unit 414 are retrieved 512. The last valid GPS reading and the associated quality parameters are stored 508 in a mobile unit GPS buffer 410.

The GPS quality parameters, such as number of satellites in view, dilution of precision, or any other GPS quality parameter well known to those skilled in the art are compared 516.

The GPS reading with the highest quality value is selected 518, based on the previous comparison of the GPS quality parameters 516. The GPS position data determined by the quality parameters comparison is sent 520 to the service management subsystem (116, FIG.1) by the telematics unit 402.

The invention claimed is:

1. A system for routing a call to an answering point comprising:
   a mobile unit capable of initiating a call and transferring position data with the call;
   a call center receiving the call and the position data; and
   a network coupling the call center to a mobile switching center serving the mobile unit,
   wherein position data is transferred from the mobile unit to the call center and, upon a connection from the call center to the mobile switching center, from the call center to the mobile switching center, and
   wherein the mobile switching center utilizes the position data to connect to an answering point associated with a location of the mobile unit.

2. The system of claim 1, wherein the first mobile switching center serving the mobile unit is selected based on the unit position data.

3. The system of claim 1, wherein the position data is utilized by another mobile switching center to identify the mobile switching center.

4. The system of claim 1, wherein the mobile unit is further capable of transferring additional data relating to the mobile unit.

5. The system of claim 1, wherein the mobile unit is capable of voice communications with the answering point.

* * * * *